Nov. 17, 1936.  J. A. DIENNER  2,060,979
INTERNAL COMBUSTION ENGINE
Filed Sept. 24, 1931  4 Sheets-Sheet 1
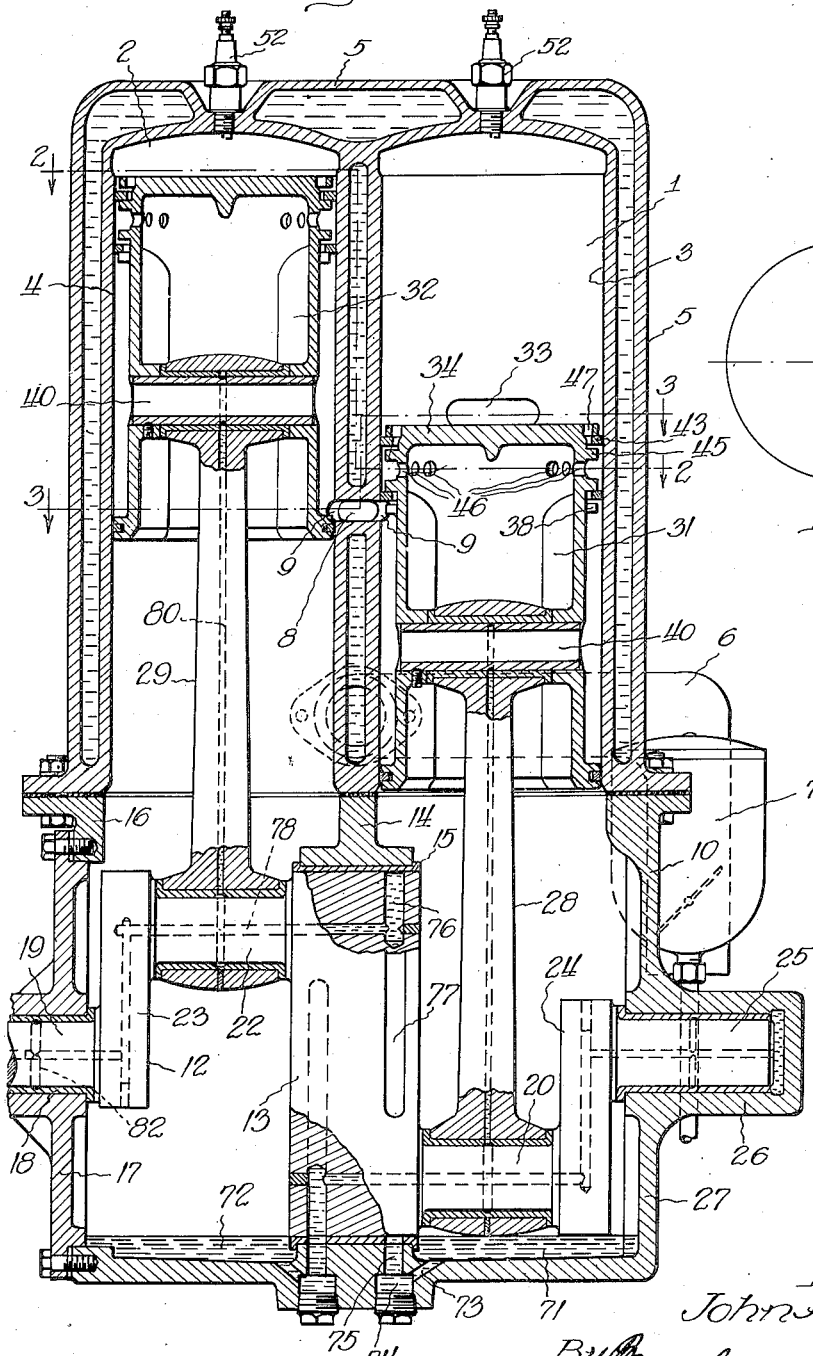
Inventor
John A. Dienner.

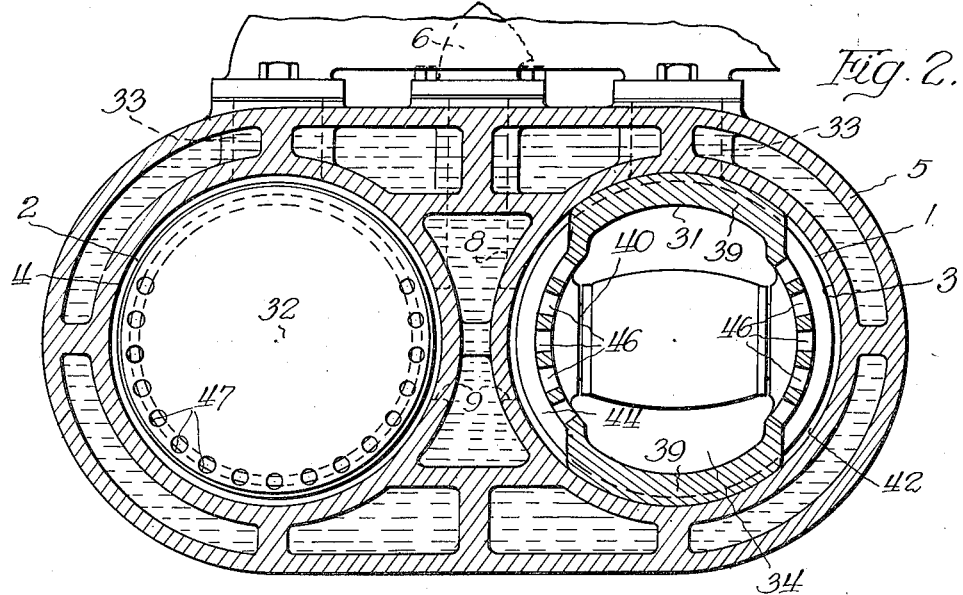
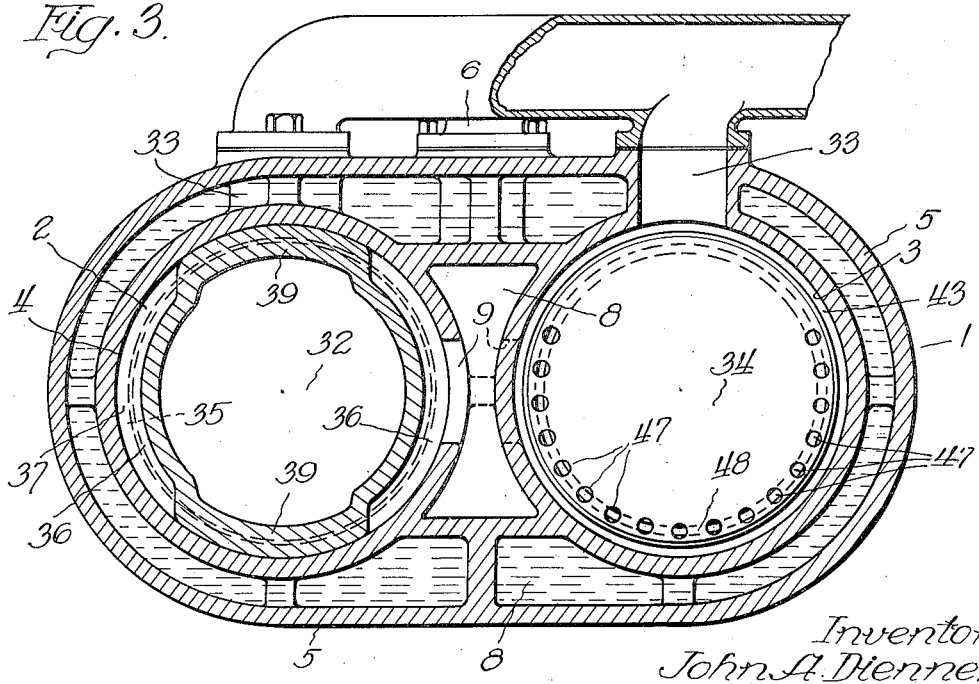

Nov. 17, 1936.  J. A. DIENNER  2,060,979
INTERNAL COMBUSTION ENGINE
Filed Sept. 24, 1931  4 Sheets-Sheet 3

Inventor:
John A. Dienner.
By [signature]
Attys.

Nov. 17, 1936.     J. A. DIENNER     2,060,979
INTERNAL COMBUSTION ENGINE
Filed Sept. 24, 1931     4 Sheets-Sheet 4
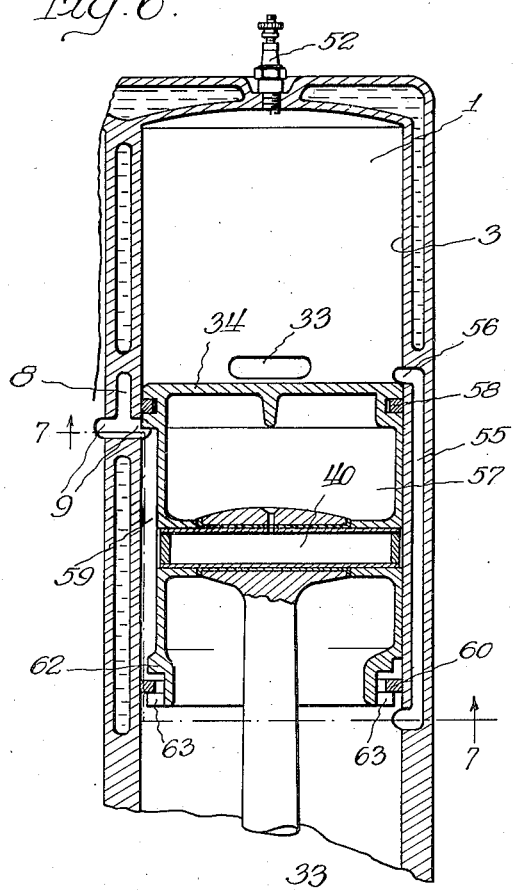
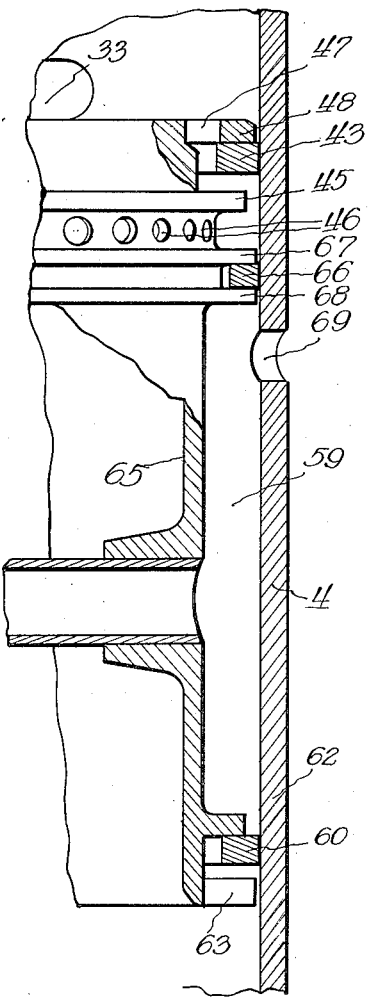
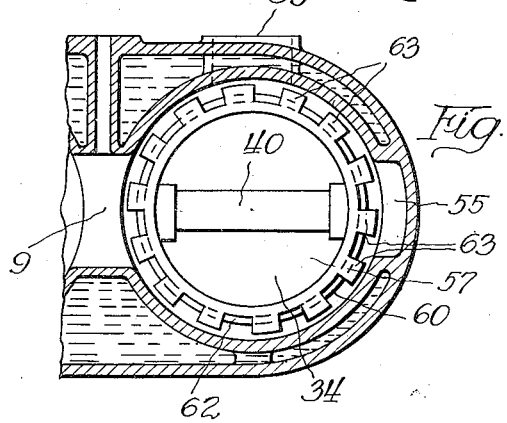
Inventor:
John A. Dienner.

Patented Nov. 17, 1936

2,060,979

UNITED STATES PATENT OFFICE 2,060,979

INTERNAL COMBUSTION ENGINE

John A. Dienner, Evanston, Ill., assignor of one-half to Herbert E. Bucklen, Elkhart, Ind.

Application September 24, 1931, Serial No. 564,786

9 Claims. (Cl. 123—47)

My invention relates to internal combustion engines, and more particularly to two stroke cycle engines. While I have shown the invention as embodied in a two cylinder engine suitable for marine engine practice, I do not intend to limit the invention to that particular field or to the specific form shown.

In a two cycle engine the mixture is injected or transferred into the working cylinder after the explosion gases are exhausted. It has been customary in making the transfer from the crank case to have the piston overrun an intake port leading into the cylinder. The uncovering of the intake port has no relation at all to the pressure prevailing in the engine cylinder. If the port is uncovered before the pressure has dropped below the intake pressure, the entry of mixture is retarded and the optimum conditions of operation are not attained. Also, if the pressure drops below the pressure of the mixture, the entry of mixture is retarded until the port is opened. Hence the engine may be called upon to work under adverse conditions.

Now according to my invention the opening and closing of the intake passageway to the cylinder is controlled by a pressure controlled valve. This valve is preferably in the form of a piston ring, and in the preferred form of the invention performs the dual function of an intake valve and of a piston ring. This valve is subjected to two operating forces, namely, ring friction and pneumatic pressure difference. In the preferred form of the invention these forces work in conjunction. I believe it is broadly new in this art to have the intake valve of a two cycle engine subject to said operating forces, or either of them.

The structure permits of a number of advantages.

First, there need be no by-pass passageway formed in the cylinder walls. Second, the mixture passes into intimate contact with the bottom of the cylinder head and the adjacent side walls of the cylinder, cooling the same. Third, the valve, i. e., the piston ring is subject to the cooling effect of not only the mixture, but also the water-jacketed cylinder walls. Fourth, the valve action is exceedingly sharp and quick. The valve opens just as soon as the pressure difference is reduced to a point where ring friction is great enough to open the valve. This ring friction increases as the piston velocity increases and thereby provides an automatic increase or lead in the point of valve opening. Fifth, lubrication of the cylinder walls is better because the mixture bearing the lubricating oil is brought into intimate contact with the cylinder walls in its passage to the working space. Sixth, greater volumetric efficiency of the cylinders is attainable.

There are other advantages which will be more apparent as the description proceeds.

In two cylinder, two cycle engines the use of a common carburetor requires a distribution valve, because the pressure in the crank case section of each cylinder is out of phase with the pressures of the other crank case sections and the intake manifold must be closed off from each crank case section after it has drawn its charge from the carburetor. According to the prior art, this has taken the form of a rotary distribution valve. Such a valve is not altogether satisfactory because of the brief time or angular part of the cycle that the valve can be kept open because of mechanical limitations.

According to my invention a mechanically actuated valve in the form of a piston ring is employed on each piston to control the communication between the intake manifold and the crank case. This renders each cylinder pneumatically independent of the others and provides it with its own individual valve action. This distribution valve system has a number of advantages.

First, the valve action is exceedingly quick and sharp, the valve opens wide and shuts off in an exceedingly small part of the throw of the crank. This provides greater volumetric efficiency than has heretofore been possible. Second, the friction of the distribution valve of my invention is unusually small. Third, each cylinder is independent of the others, hence a multicylinder engine of any number of cylinders is just as easily constructed as a single or two cylinder engine. Fourth, throttle control of a two cycle multicylinder engine is easily attainable. Fifth, lubrication of the cylinder walls is improved. Numerous other advantages are attainable.

It is to be noted that in the structure herein shown and described by way of example, the two valves of my invention are conjointly employed. However, as I shall point out more in detail, each valve may be independently employed in an engine and certain of the advantages attained. For example, the intake valve of my invention may be omitted and an overrun port and by-pass cored in the cylinder walls may be employed as a substitute while at the same time the distribution valve of my invention is retained. Likewise, a known form of rotating distribution valve may be employed instead of my type of distribution valve and the intake valve may be retained.

The conjoint use of the two valves provides a simple and advantageous construction as will be apparent.

In addition to the valve action aforesaid, my invention provides a novel system of lubrication suitable for a two cycle engine, and particularly suitable for the employment of lubricating oil in the gasoline or splash lubrication under suitable circumstances.

The system may also be adapted to full force feed lubrication without an oil pump.

Now in order to acquaint those skilled in the art with the method of constructing and operating a device embodying my invention I shall describe, in conjunction with the accompanying drawings, a specific embodiment of the same.

In the drawings:

Figure 1 is a vertical longitudinal section through an engine embodying my invention;

Figure 2 is a transverse cross-section taken on the line 2—2 of Figure 1 looking in the direction of the arrows;

Figure 3 is a similar cross-section taken on the line 3—3 of Figure 1 and looking in the direction of the arrows;

Figure 6 is a fragmentary vertical section showing a modified form of piston and valve arrangement;

Figure 7 is a transverse sectional view of the same;

Figure 8 is a valve diagram; and

Figure 9 is a fragmentary view like Figure 1 of a modified form of piston in an engine of my invention.

Figure 4:
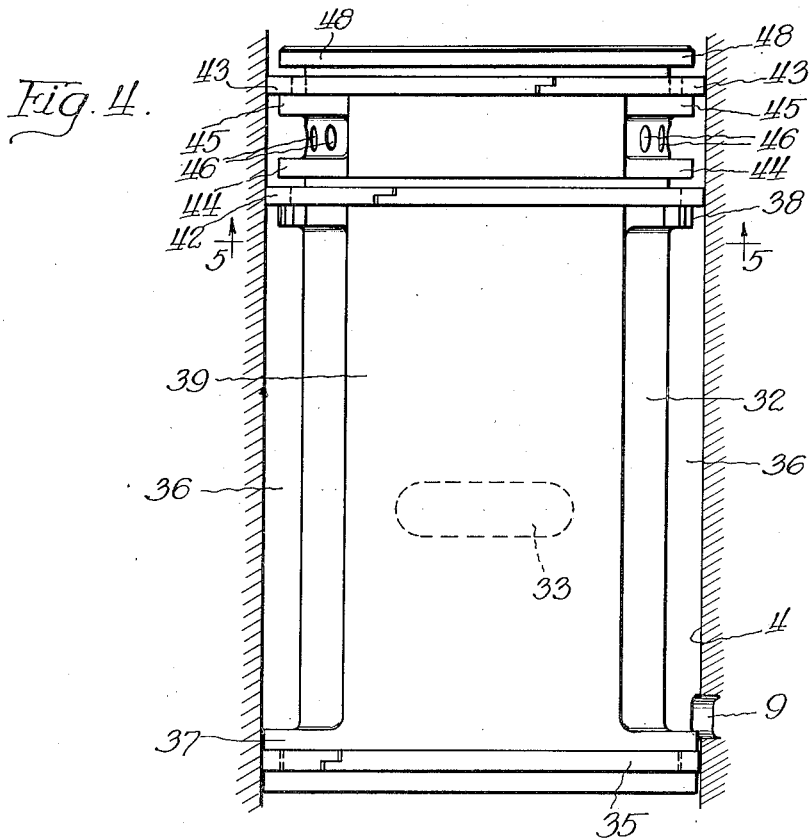
Figure 4 is a side elevation of a piston embodying my invention.

The engine shown and described in the present application is of the type disclosed in my Patent No. 1,906,251, of May 2, 1933, and particularly relates to a two-cycle multicylinder form of engine. In Figure 1 the engine is shown as having two working cylinders, namely, 1 and 2, these two cylinders having cylinder walls 3 and 4, preferably cast integral with the walls 5—5 of a water jacket surrounding the working cylinders. An intake manifold 6 leading from the carburetor 7 opens into a passageway 8 disposed between or adjacent to proximate walls of the cylinders 1 and 2. The cylinders have inlet openings 9—9 forming intake passageways communicating with the passageway 8 at their outer ends and with the interior of the cylinder walls 3—4 at their inner ends.

The cylinder block, which is preferably cast as one piece, is suitably flanged and the flange thereof cooperates with a flange on the crank case 10. This crank case 10 provides separate chambers for each cylinder. The crank shaft 12 has a central enlarged cylindrical bearing portion 13 which is adapted to bear in a bearing provided by central web 14 and bushing 15. The end wall 16 of the crank case has an opening large enough to permit the crank shaft and its central bearing portion 13 to be introduced endwise into the crank case and the said wall is closed by a plate 17 having a suitable bearing 18 for the shaft 19 which extends to the power operated device. The crank shaft has in this case two wrist-pins 20 and 22 connected to the central cylindrical portion 13 and to the crank arms 23 and 24. A cylindrical extension of the shaft at 25 provides a bearing in a recessed part 26 in the end wall 27 of the crank case. The wrist pins 20 and 22 are connected by connecting rods 28 and 29, respectively, to the pistons 31 and 32 which operate in the cylinders 1 and 2, respectively.

The cylinders 1 and 2 are provided with exhaust ports 33—33 which are overrun by the pistons and opened only at the lower end of the stroke of the corresponding piston. The cranks of the crankshaft are 180° apart in the present instance. The two pistons 31 and 32 are alike in construction, and a description of one in detail will suffice for both.

Figure 5:
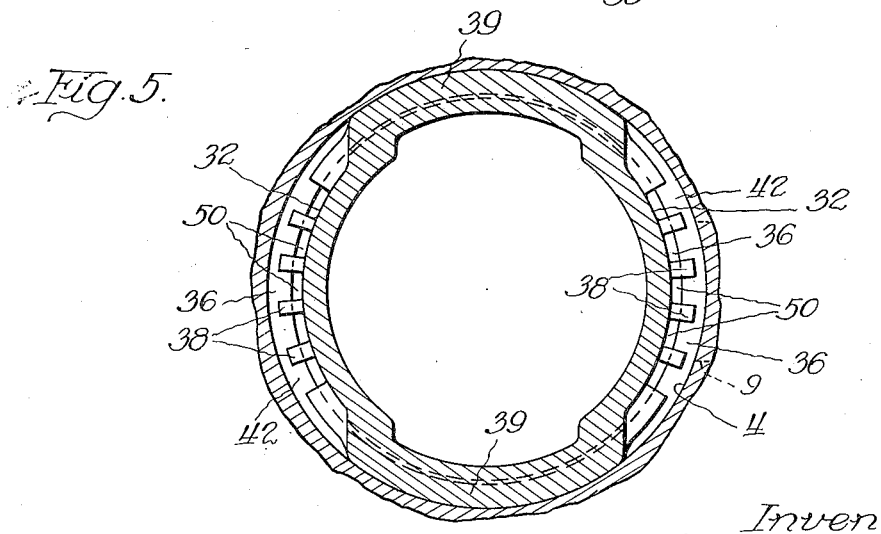
Figure 5 is a transverse section of the same taken on the line 5—5 of Figure 4.

The piston 32 has a head member 34 with depending skirts or walls extending downwardly to the lower end where the sealing ring 35 is seated in a groove to preserve a tight fit between the piston and the wall 3, the ring 35 separating the crank case chamber from that portion of the intake passageway which is formed by a groove, or cutting away 36 of the side walls of the piston 32. It will be observed, as shown in Figures 1, 4 and 5, that the piston 32 is formed with longitudinally extending grooves 36—36 upon opposite sides of the same, these grooves extending along a part only of the length of the piston. At the lower ends the grooves are terminated by a full cylindrical wall 37 which lies immediately above the sealing ring 35. At the upper ends of the grooves there is the cylindrical flange 38 merging into the full cylindrical bearing portions 39—39 which lie in the plane of the crank throw. That is to say, the thrust of the connecting rods is taken through the wrist pins 40—40 and transmitted to the piston walls which have the bearing portions 39—39 in direct alignment with the thrust of the connecting rods. Thus a suitable bearing may be provided on the two sides of the piston for guiding the same in the cylinder, these bearing portions also providing a seal for the overrunning exhaust port 33 and for by-pass ports where the same are employed as in the case of an overrunning transfer port and passageway, as shown in Figures 6 and 7.

The ring 42 is held loosely in the groove defined between the flange 38 and the flange 43. I have shown the endwise play in Figure 4 in exaggerated form. This play constitutes valve lift and the valve lift is dependent upon the proportions of the engine. The valve lift should be so small, however, as to prevent any tendency of the ring 42 to cock. The cross-section of the ring 42 is such as to leave ample clearance between the inside diameter of the ring and the bottom of the groove between the flanges 44 and 38.

The ring 43 which is the top ring, likewise lies in a groove between the flanges 45 and 48 and has clearance both axially and radially as has the ring 42. Between the flanges 44 and 45 I provide a groove which may be about the entire periphery or which may be interrupted by the bearing portions 39 as shown in Figure 4. Openings 46—46 extend through the side walls of the pistons between the rings 42 and 43 and these openings form continuations of the intake passageway leading from the carburetor manifold 46 to the crank chambers of the respective cylinders.

The flange 48 is drilled with a series of openings as shown in Figure 2, these openings 47 communicating with the space back of the ring 43 at all times and serving, when the ring 43 leaves the flange 45, to provide communication between the working cylinder and the crank chamber. These openings 47 therefore form a part of a valved transfer passageway. The piston 32 of Figure 4 is in the same position as the piston 32 in Figure 1, that is to say, it is just completing the compression stroke. Piston 31, on the contrary, is just completing its downward travel and gas is passing from the crank chamber below the piston 31 through the central part of the piston openings or ports 46 around the lower flange 38, back of the ring 44, through the openings 47 in the flange 48 and into the working cylinder. These openings 47 are preferably formed around only a part of the periphery so as to avoid discharging combustible mixture out of the exhaust passageway 33.

The rings 42 and 43 tend to remain in any position on the cylinder wall 4 in which they are left because of friction with said wall. Due to the play between the sides of the grooves and the rings there is a small movement of the piston possible before the play is taken up, and this small movement is the valve-actuating movement. That is to say, consider the cylinder 1 and piston 31 as shown in Figure 1 as having just discharged the contents of the crank chamber below the piston 31 into the cylinder 1 through the central part of the piston 31, through the openings 46, around the outer edge of the flange 38, back of the flange 44 and through the openings 47 into the working cylinder 1. Assume, also, that the crank is at the very bottom of its throw and further rotation of the crank shaft results in a rising of the piston 31. It will be observed that the ring 42 is seated against the bottom of the flange 44 and the ring 43 is seated against the bottom of the flange 48. Thereby, the ring 44, which is also a valve, is open, permitting the passage of gas past it, but the ring 42, which is also a valve, is closed, forming a seal between the flange 44 and the cylinder wall 3, preventing the passage of gas past the same. These ring valves are preferably double-lapped piston rings of known type which are now on the market. The sealing ring 35 is intended to be tight at all times.

As the piston 31 rises from the position shown in Figure 1 for a brief angular motion of the crankshaft, the piston 31 moves without moving the rings or valves 42 and 44. As represented on the valve diagram of Figure 8, a certain small angular motion A is necessary to cause the piston to move vertically the distance represented by B where that distance is equal to the clearance which the rings have in their grooves. It can be seen, therefore, that the actuation of the valves from fully opened to fully closed position and vice versa is accomplished in a minimum of angular motion of the crank shaft and that therefore the volumetric efficiency of the engine is greatly improved.

As the piston 31 rises the lower ring 42 is engaged by the lower flange 38, which lower flange is interrupted or slotted as by means of the cuts or notches 50—50 indicated on Figures 1 and 4 but shown in elevation in Figure 5. At the same time the flange 38 engages the upper ring 44 to form a tight seal as the piston travels upward. Therefore, the rising of the piston 31 in the lower part of the cylinder enlarges the chamber, which may be termed the crank case chamber, causing gas to be drawn through the carburetor 7, intake manifold 6, passageway 8, corresponding passageway 9, through the notches 50 back of the ring 42, through the space between the flange 44 and the cylinder wall, through the openings 48—46 and down into the crank chamber. At the same time so much of the mixture as is trapped between the piston ring 44 and the cylinder wall above the exhaust passageway 33 is compressed so that compression above the piston and suction below the piston occur at the same time. Upon reaching approximately top center of the crank throw the charge is ignited as by means of a spark plug, suitably energized, as is well known in the art. The resultant rise in pressure caused by firing of the gas maintains the ring 43 in contact with the flange 45, thereby maintaining a tight joint between the cylinder wall 3 and the piston 31 so long as the pressure in the cylinder exceeds the ring friction against the wall of the cylinder. As soon as the piston is forced down past the overrunning port 33 and the pressure in the cylinder 1 drops below the compression pressure in the crank chamber the ring 43 will be raised and the mixture will pass through the openings 46, under the ring 43, through passageways 47 and into the cylinder 1.

It will be observed that the compression within the crank case is held against escaping into the intake passageway by the ring 42. The friction of the ring 42 may be made great enough that together with the continued travel of the ring downwardly, this valve will remain tight for the relatively small pressures which are generated within the compression crank chamber.

It will be observed that while one piston such as 31 is compressing the charge it is cut off from the intake manifold, whereas the other piston is drawing a charge into the crank chamber and is in communication with the intake manifold.

The aforesaid disadvantage of having the compression pressure tending to open the valve 42 may be overcome, as above stated, by a slight increase of ring friction, or it may be overcome by employing an overrunning transfer port and passageway, as shown in Figures 6 and 7, or by interposing a sealing ring between the intake and transfer parts of the piston, respectively, as shown in Figure 9.

Referring now to Figures 6 and 7, the right-hand cylinder 1 is illustrated as being provided with a transfer passageway 55 terminating in an overrunning port 56 at the upper end thereof, for the transfer of the compressed charge from the crank chamber below the piston to the working cylinder 1 above the piston. In this case the piston 57, corresponding to piston 31, has a different arrangement for securing the intake and transfer of mixture. A sealing ring 58 forms a tight seal between the head 34 and the cylinder wall 3. Immediately below the seal of the ring 58 a groove 59 longitudinally of the cylinder is provided. Preferably the passageway 55 is disposed in the cylinder walls diametrically opposite the exhaust passageway 33, but for the sake of clearness of illustration I have shown the same at 90° in Figures 6 and 7. If two grooves 59 corresponding to grooves 36 shown in Figures 4 and 5 are provided and the transfer passageway 55 is opposite the exhaust port 33, these grooves are put in communication through the hollow wristpin 40 as shown in Figures 1 and 9. However, if the transfer passageway 55 should be left in the 90° position as shown in Figures 6 and 7 the hollow wrist pin 40 should have its ends closed off as shown in Figure 6.

The lower end of the piston 34 provides a ring valve employing the ring 60 lying loosely in a groove between the shoulder or flange 62 and the slotted flange 63 below the same.

In the operation of this form of the engine, downward motion of the piston to compress the gas seats the ring 60 against the shoulder 62 to form a tight seal, seating both with the ring friction and with the superior pressure. The overrun port 56 and passageway 55 transfer the gas from the crank chamber to the working cylinder at the bottom of the piston stroke.

Upon the upward stroke of the piston 57 the shoulder 62 leaves the ring 60 and the ring engages the slotted flange 63, thereby opening communication between the port 9 and groove 59 to the crank chamber below the piston 57 for the purpose of drawing in a charge of mixture.

The desired action can be accomplished by the structure shown in Figure 9, wherein the piston (65 in this case) has the upper ring and valve construction 43 at the top with the openings 46 through the wall of the piston immediately below the same, and below said openings a sealing ring 66 disposed tightly in a suitable groove between flanges 67 and 68. The lower end of the piston has the ring and valve member 60, as shown in Figures 6 and 7.

The operation of this form of engine—that is, as shown in Figure 9—is as follows:

Upon the upward stroke of the piston to compress the gas the ring 43 seals against the cylinder wall 4 and the flange 45 immediately below it, whereas the ring 60 is engaged by the notched flange 63, permitting gas to pass from intake port 9 along the longitudinal groove 59 and between the flange 62 and the cylinder wall and back of the ring 60 into the crank chamber.

Upon downward motion of the piston the gas is trapped by the ring 60 engaging the cylinder wall 4 and the flange 62 and is prevented from passing to the intake passageway by the sealing ring 66 and also is prevented from passing into the working cylinder 1 so long as the superior pressure of the gas above the ring 43 holds it against the flange 45. Thus in each case the corresponding ring valve operates to the best advantage.

The engine herein shown also embodies an improved lubricating system. A suitable sump is formed in each crank chamber. The sump 71 communicates by way of a passageway 73, plugged recess 74 and drilled passageway 75 with the surface of the bearing bushing 15. The crank shaft at its central cylindrical portion 13 has a drilling 76 communicating with a groove 77 upon the surface, so that during a part of the compression stroke of the crank chamber oil is forced from the sump 71 through the groove 77 and into the drilling 76. The drilled passageway 76 communicates further with a passageway 78 through the wristpin 22. This in turn communicates with cross passageway 79 leading to the surface of the wristpin, from whence oil is transferred to a longitudinal passageway 80 in the connecting rod to the wristpin. The horizontal passageway 78 communicates through suitable drilled passageways with transverse drilling 82 which lubricates the cylindrical bearing 18 of the crank shaft. Thus, when there is suction below the piston 32 pressure is exerted below the piston 31 to force the oil from the opposite sump. The reciprocal relation holds good between the sump 72 and the bearings for the right half of the engine, that is, below the piston 31. Thus a positive force feed lubrication is secured for the working parts of both cylinders.

The sump need not be in the part of the crank case opposite the cylinders, for if the engine be turned so as to have the crank shaft vertical the sump may be correspondingly located on the transverse walls which in Figure 1 are now vertical.

Any number of cylinders may thus be employed in the engine, the invention not being confined to a two-cylinder and not, in fact, to a multi-cylinder engine at all.

I do not intend to be limited to the details shown and described.

I claim:

1. In a piston, a pair of ring grooves disposed substantially at opposite ends of the piston, the piston having openings through the side walls thereof adjacent the top groove, a ring in each groove, the top ring acting as a valve to permit the flow of gas from inside the piston through said openings to a point above the piston, there being a longitudinal depression in the wall of the piston forming a passageway disposed between said ring grooves, and the ring in the lower groove acting as a valve to permit the flow of gas from said longitudinal depression to a point below the piston.

2. In an engine a cylinder having an admission port, a piston for said cylinder, said piston having a transfer passage through a wall thereof and having an admission passage disposed longitudinally of the piston and being in communication with the admission port, and a plurality of ring valves carried by the piston and controlling the flow of fluid through said passages respectively.

3. In an engine the combination of a working cylinder provided with an exhaust port and an inlet port, a crank case, a piston working between the cylinder and the crank case, a valve carried by the piston and operated by motion of the piston for controlling the communication between the inlet port and the crank case, and a second valve carried by the piston and operated by motion of the piston for controlling the communication between the crank case and the cylinder.

4. In a piston a pair of spaced ring grooves, there being openings through the side wall of the piston between said grooves and a ring of less width than the width of the groove disposed in each groove, said ring grooves having openings at their sides towards opposite ends of the piston.

5. In an internal combustion engine having a cylinder provided with an overrun exhaust port and having an admission port through the cylinder wall, a piston having a ring valve at each end, there being openings through the piston wall placing the upper ring valve in communication with the inside of the piston and there being a groove longitudinally of the piston placing the intake port in communication with the lower ring valve.

6. In an internal combustion engine having a cylinder provided with an overrun exhaust port and having an admission port through the cylinder wall, a piston having a ring valve at each end, there being openings through the piston wall placing the upper ring valve in communication with the inside of the piston and there being a groove longitudinally of the piston placing the intake port in communication with the lower ring valve, and a sealing ring for the piston intermediate said valves.

7. In an engine a cylinder having an intake port, a piston for the cylinder, said piston having at its upper end a transfer ring valve actuated jointly by friction and pneumatic pressure difference controlling the passage of gas from below the piston to the top of the piston, and an admission ring valve spaced from said first valve and actuated by friction controlling communication between said intake port and the space below the piston.

8. In an engine of the class described, a working cylinder having a piston, a crank case for the piston, a crankshaft cooperating with the piston, means for transferring mixture from the crank case to the cylinder upon completion of each power stroke, mixture supplying means comprising a port formed through the cylinder wall, said piston having a passageway from said port to the interior of the crankcase, and a friction operated piston ring valve carried by the piston for controlling said passageway.

9. In an engine, a cylinder having an admission port, a piston for said cylinder, said piston having a transfer passage through a wall thereof and having an admission passage for the air-fuel charge disposed longitudinally of the piston and wholly within the diameter of the piston, and being in constant communication with the admission port, and a pair of ring valves carried by the piston controlling alternately the flow of fluid through said transfer passage in opposite directions.

JOHN A. DIENNER.